US008726058B2

(12) United States Patent
Mizutani (10) Patent No.: US 8,726,058 B2
(45) Date of Patent: May 13, 2014

(54) POWER SUPPLY SYSTEM, POWERED DEVICE, AND POWER RECEPTION METHOD

(75) Inventor: Koichi Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 13/027,145

(22) Filed: Feb. 14, 2011

(65) Prior Publication Data

US 2011/0202784 A1 Aug. 18, 2011

(30) Foreign Application Priority Data

Feb. 15, 2010 (JP) ................................. 2010-030455

(51) Int. Cl.
*G06F 1/26* (2006.01)
(52) U.S. Cl.
USPC .............................. 713/340; 713/330; 326/30
(58) Field of Classification Search
USPC ........................................................ 713/340
See application file for complete search history.

(56) References Cited

U.S. PATENT DOCUMENTS

| 7,145,439 | B2 * | 12/2006 | Darshan et al. | 340/12.32 |
| 7,355,416 | B1 * | 4/2008 | Darshan | 324/713 |
| 7,417,443 | B2 * | 8/2008 | Admon et al. | 324/713 |
| 7,696,765 | B2 * | 4/2010 | Yu | 324/722 |
| 7,827,418 | B2 | 11/2010 | Herbold | |
| 7,956,616 | B2 * | 6/2011 | Yu | 324/525 |
| 8,006,105 | B1 * | 8/2011 | Sivertsen | 713/300 |
| 8,225,124 | B2 * | 7/2012 | Geiger et al. | 713/340 |
| 2005/0086546 | A1 * | 4/2005 | Darshan et al. | 713/300 |
| 2006/0178783 | A1 * | 8/2006 | Herbold et al. | 700/286 |
| 2006/0215680 | A1 * | 9/2006 | Camagna | 370/419 |
| 2008/0164890 | A1 * | 7/2008 | Admon et al. | 324/713 |
| 2009/0222678 | A1 * | 9/2009 | Yu et al. | 713/300 |
| 2011/0283120 | A1 * | 11/2011 | Sivertsen | 713/300 |

FOREIGN PATENT DOCUMENTS

| CN | 101594236 A | 12/2009 |
| JP | 2000-134228 A | 5/2000 |
| JP | 2008-154069 A | 7/2008 |

OTHER PUBLICATIONS

IEEE Computer Society, Carrier Sense Multiple Access with Collision Detection (CSMA/CD) Access Method and Physical Layer Specifications, IEEE Std 802.3af™-2003 Power over Ethernet™ standard Part 3 (Superseded), Jun. 18, 2003, pp. i-ix, 1-121, The Institute of Electrical and Electronics Engineers, Inc., New York, NY.

IEEE Computer Society, Carrier Sense Multiple Access with Collision Detection (CSMA/CD) Access Method and Physical Layer Specifications, IEEE Std 802.3af™-2003 Power over Ethernet™ standard Part 3, 33C.1.10 Test Procedure PSE-10 (Superseded), Jun. 18, 2003, pp. 100-102, The Institute of Electrical and Electronics Engineers, Inc., New York, NY.

* cited by examiner

*Primary Examiner* — Ryan Stiglic
(74) *Attorney, Agent, or Firm* — Canon USA, Inc., IP Division (57) ABSTRACT

Power sourcing equipment starts power supply after outputting a detection signal to a transmission line and detecting that a powered device is connected with the transmission line. The powered device includes a power storage unit configured to store power obtained from the detection signal output from the power sourcing equipment, and a correction unit configured to correct an impedance unbalance in the transmission line. The power storage unit provides the stored power to the correction unit.

19 Claims, 8 Drawing Sheets

OPERATIONAL AMPLIFIERS 305
AND 306 RECEIVE POWER
FROM POWER STORAGE UNIT 1

POWER SUPPLY SYSTEM, POWERED DEVICE, AND POWER RECEPTION METHOD

BACKGROUND OF THE INVENTION

1. Field of the Invention

The present invention relates to a power supply system, a powered device, and a power reception method for correcting an impedance unbalance in a transmission line used to supply power.

2. Description of the Related Art

The Power over Ethernet (PoE, registered trademark) system specified by the Institute of Electrical and Electronic Engineers (IEEE) 802.3af standard is conventionally known as a system for supplying power via a communication line, such as an Ethernet (registered trademark) cable.

In PoE, power sourcing equipment (PSE) supplies power to a powered device (PD). The IEEE 802.3af standard specifies a sequence for such power supply. In PoE, the PSE supplies power to the PD through three phases, detection, classification, and power supply. The PD incorporates a signature resistance of 25 KΩ (representative value). In the detection phase, the PSE outputs a low voltage to detect the connection of the PD with the line. The low voltage used for the detection ranges from 2.8 to 10 V, and a current of up to 5 mA is supplied. When the voltage output from the PSE is applied to the signature resistance in the PD, a current corresponding to 25 KΩ flows through the line. After detecting the current value corresponding to 25 KΩ, the PSE proceeds to the classification phase.

In the classification phase, the PSE also detects a predetermined current generated due to a resistance value in the PD to thereby classify the power consumption of the PD. The PSE then proceeds to the power supply phase in which the PSE normally delivers a voltage of 48 V, and the PD is allowed to consume power up to 12.95 W. (see, for example, Japanese Patent Application Laid-Open Nos. 2008-154069 and 2000-134228; "IEEE Standard for Information technology-Telecommunications and information exchange between systems-Local and metropolitan area networks-Specific requirements Part 3: Carrier Sense Multiple Access with Collision Detection (CSMA/CD) Access Method and Physical Layer Specifications Amendment: Data Terminal Equipment (DTE) Power via Media Dependent Interface (MDI)" published by IEEE Standards Association Standards Board and approved on 12 Jun. 2003; and 33C.1.10 Test Procedure PSE-10 (turn on, detection and classification time); for the PoE IEEE802.3af standard, see (http://telec.org/feature/feature13.html).)

There is another conventionally known power supply system that performs remote power supply using two pairs of unshielded twisted pair (UTP) cable used for data transmission. The power supply system gives an alarm upon detection of an abnormal condition of the transmission line, such as polarity reversal. (see Japanese Patent Application Laid-Open No. 2000-134228, for example.)

A transmission line connecting a conventional PSE and a conventional PD may comprise first and second constituent lines Each constituent line may, for example, be a twisted-pair cable. In such a case, a first stray capacitance C1 may be considered to exist between the first constituent line and a frame ground (FG) of the PSE, and a second stray capacitance C2 may be considered to exist between the second constituent line and FG. Usually, there is a relationship that the stray capacitance C1≠the stray capacitance C2. When the relationship the stray capacitance C1≠the stray capacitance C2 is satisfied, the transmission line becomes unbalanced. This causes a noise immunity level to decrease, so that 50/60 Hz alternating current (AC) noise (hum noise) is induced from an alternating current (AC) source in the PSE. The hum noise may also be induced from an AC source in an external device (for example, a picture monitor) connected to the PD (for example, a network camera).

In the power supply system in which the PSE detects the PD, if such hum noise is induced into the transmission line, 50/60 Hz AC noise having an amplitude of xxVpp, for example, is superimposed on a low voltage used to detect the PD (hereinafter referred to as a "detection voltage").

As the amplitude of the superimposed AC noise increases, a value of the current generated as a result of the PD's reception of the detection voltage exceeds a current value range in which a detection device in the PSE can detect the PD, so that detection failure may occur. Accordingly, the PSE repeats the detection process and cannot proceed to the next phase to start power supply, and the PD is left in an inoperative state.

To address this, Japanese Patent Application Laid-Open No. 2000-134228 discusses to provide a detection device that detects an abnormal condition of a transmission line on the PSE side. When the detection device detects an abnormal condition, an impedance of the transmission line may be adjusted to enable the PSE to detect the PD. However, to install an impedance adjustment device on the power supply unit side, the networking equipment, such as the already-existing PSE and the installation condition thereof, needs to be replaced.

On the other hand, installation of the impedance adjustment device for the transmission line on the PD side does not require such large-scale replacement of the networking equipment. However, if the impedance adjustment device for the transmission line is installed on the PD side to correct an impedance unbalance in the transmission line prior to the start of power supply and enable the PSE to detect the PD, the power necessary for operating the impedance adjustment device needs to be provided before the start of power supply.

SUMMARY OF THE INVENTION

It is desirable to provide a power supply system and a powered device that can correct impedance unbalance in a transmission line before power supply is started, without the need to replace an already-existing power supply unit and other equipment.

According to an aspect of the present invention, a power supply system includes power sourcing equipment, and a powered device configured to receive power from the power sourcing equipment via a pair of lines. The power sourcing equipment starts power supply to the powered device after outputting a detection signal to the powered device via the pair of lines and detecting a predetermined response made by the powered device. The powered device includes a storage unit configured to store power, and a correction unit configured to correct an impedance unbalance in the pair of lines, wherein the storage unit stores power obtained from the detection signal output from the power sourcing equipment and provides the stored power to the correction unit.

According to the present invention, a system having enhanced connectivity can be established in which a powered device corrects an impedance unbalance in a transmission line. Further, connectivity between power sourcing equipment and a powered device can be enhanced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
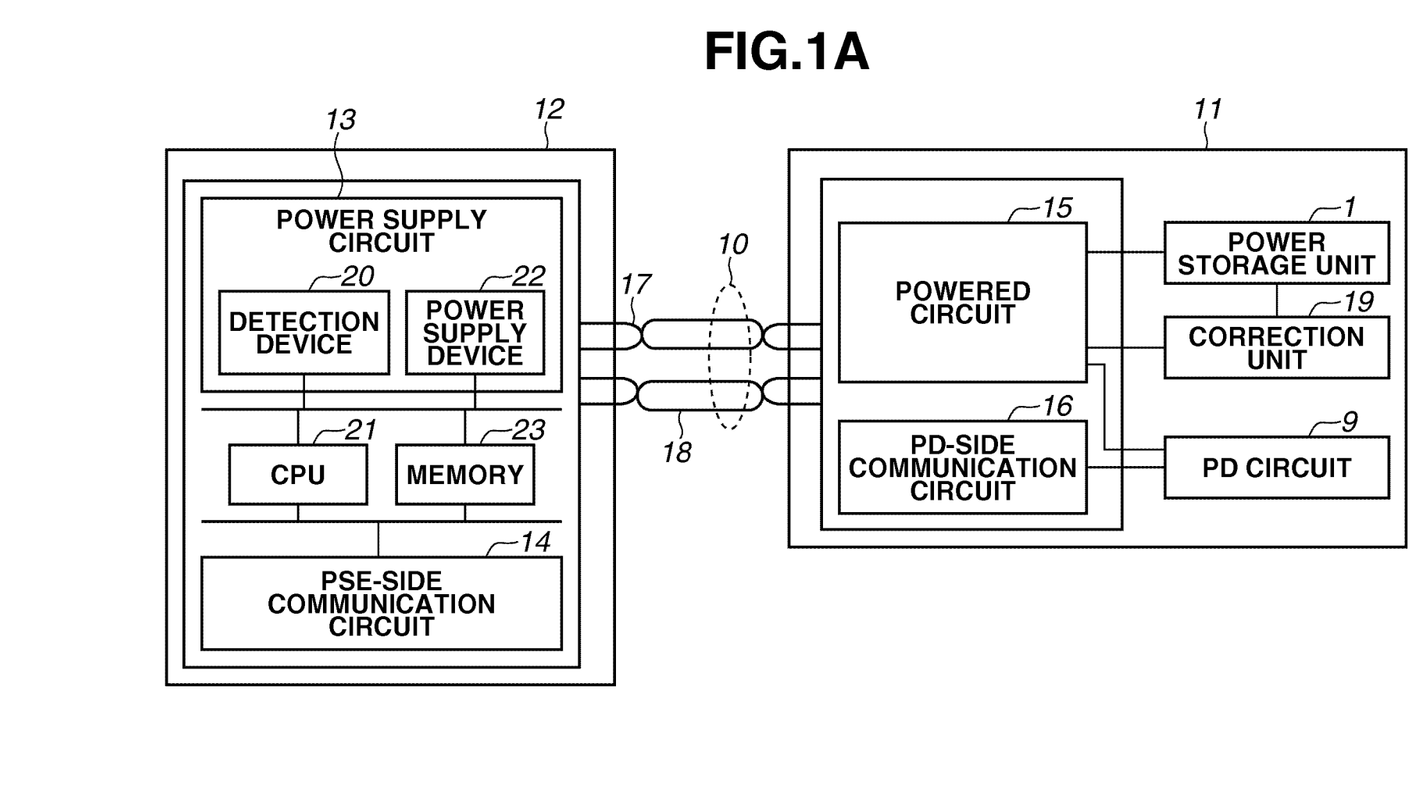
FIGS. 1A and 1B are block diagrams illustrating power supply systems according to a first exemplary embodiment of the present invention.
Figure 1B:
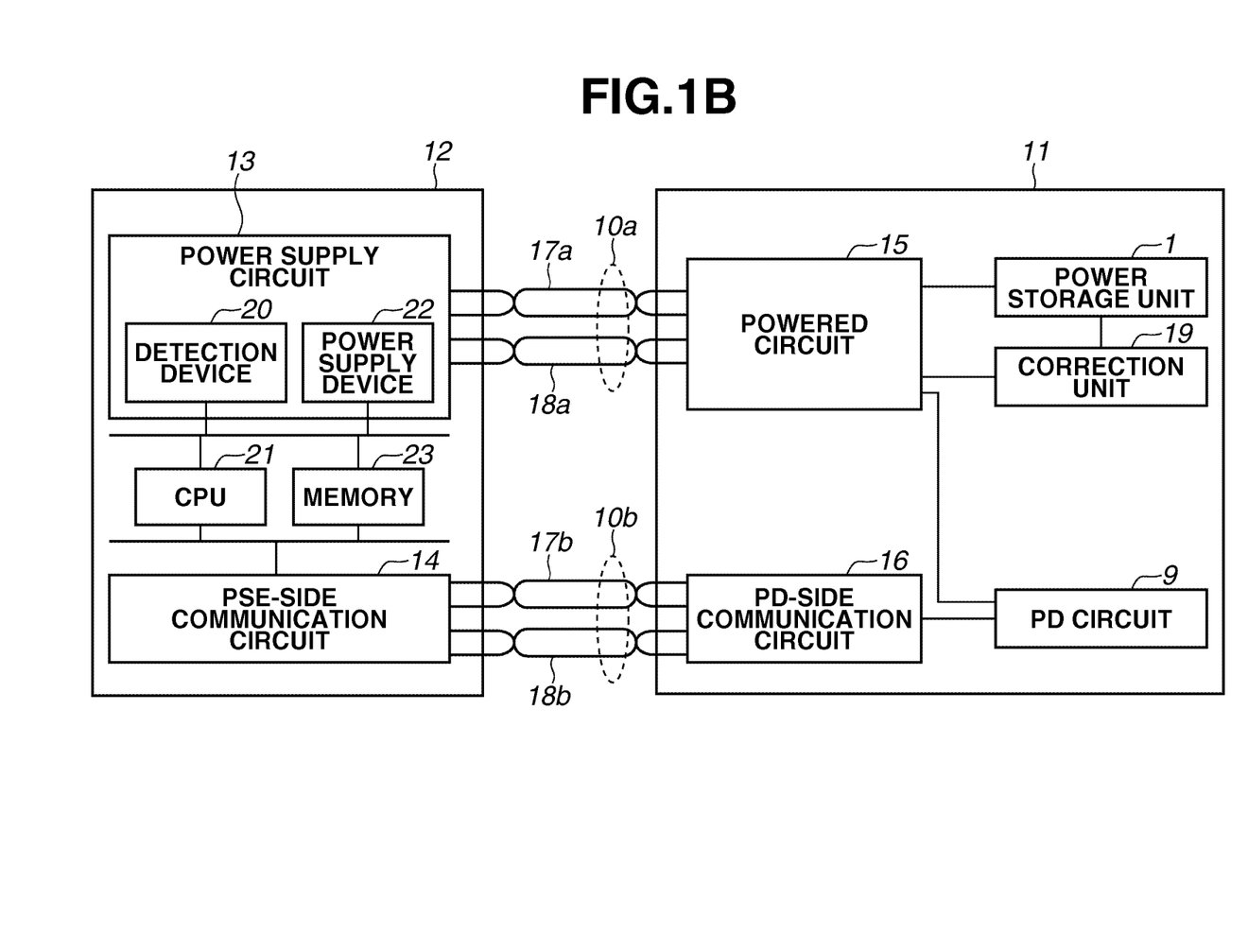

FIGS. 1A and 1B illustrate configurations of a power supply system according to a first exemplary embodiment of the present invention.

With reference to FIG. 1A, the configuration of the power supply system according to the first exemplary embodiment of the present invention will be described. Power sourcing equipment 12 and a powered device 11 are connected to each other via a transmission line 10. In this example the transmission line 10 includes a pair of constituent lines 17 and 18.

In the present exemplary embodiment, the lines 17 and 18 each are a twisted-pair cable, and provide balanced transmission. In the present exemplary embodiment, although twisted-pair cables are employed, the lines 17 and 18 need not necessarily be composed of twisted-pair cables. Each of the lines 17 and 18 may be a single line.

A power supply circuit 13 applies a direct-current voltage from the power sourcing equipment 12 to the transmission line 10. A PSE-side communication circuit 14 superimposes, on the applied voltage, a differential signal on the balanced line. Alternatively, as illustrated in FIG. 1B, the power supply system may include a first transmission line 10a having a first pair of constituent lines 17a, 18a used for power supply, and a second transmission line 10b having a second pair of constituent lines 17b, 18b used for transmitting and receiving communication signals.

The power sourcing equipment 12 supplies power to the powered device 11. The power sourcing equipment 12 includes the power supply circuit 13 that performs power supply, the PSE-side communication circuit 14 that establishes communication between the power sourcing equipment 12 and the powered device 11, a central processing unit (CPU) 21 that controls the power supply circuit 13 and the PSE-side communication circuit 14, and a memory 23. The power supply circuit 13 further includes a detection device 20 and a power supply device 22.

The detection device 20 measures a value of current flowing through the lines 17 and 18 (or 17a and 18a in FIG. 1B), and outputs the measured value to the CPU 21. The power supply device 22 outputs power to the powered device 11 through the lines 17 and 18 (17a and 18a) in response to an instruction received from the CPU 21. The memory 23 stores a program and data corresponding to an operation required for the CPU 21 to perform processing, and also provides the CPU 21 with a work area. Such required operation will be described below.

The powered device 11 receives power from the power sourcing equipment 12. The powered device 11 includes a powered circuit 15 and a PD-side communication circuit 16. The powered circuit 15 supplies the power received from the power sourcing equipment 12 to a PD circuit 9, which will be described below, a power storage unit 1, and a correction unit 19. The PD-side communication circuit 16 transmits a communication signal from the power sourcing equipment 12 to the PD circuit 9. Examples of the powered device 11 include, but are not particularly limited to, network cameras, laptop computers, printers, and printer servers.

Figure 2:
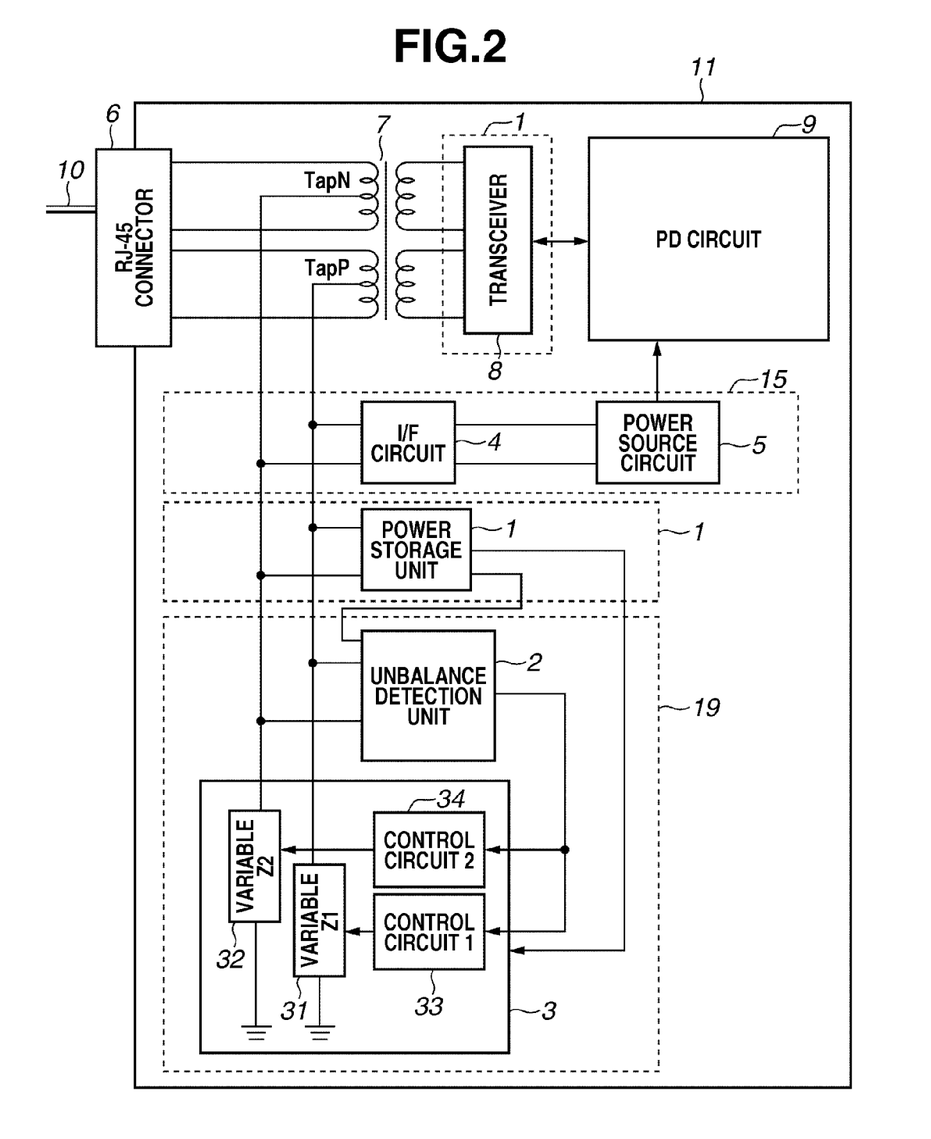
FIG. 2 is a block diagram illustrating a powered device according to the first exemplary embodiment of the present invention.

With reference to FIG. 2, the configuration of the powered device 11 will be described in detail. The transmission line 10 is connected to a transmission transformer 7 via an RJ-45 connector 6, a modular connector for local area networks (LANs). The transmission transformer 7 is terminated by a terminal element (not shown) at its primary side. From the primary side, the transmission transformer 7 outputs an applied power supply voltage. At its secondary side, a differential signal containing no direct-current component is connected to a transceiver 8.

The transceiver 8 is a device for supporting a physical layer of a communication signal and is included in the PD-side communication circuit 16 illustrated in FIGS. 1A and 1B. When transmitting data, the transceiver 8 drives the transmission line 10 via the transmission transformer 7 according to the differential signal received from the PD circuit 9. When receiving data, the transceiver 8 transmits the differential signal received from the transmission line 10 via the transmission transformer 7 to the PD circuit 9.

The powered circuit 15 illustrated in FIGS. 1A and 1B includes an interface (i/f) circuit 4 and a powering source circuit 5, which will be described below. The i/f circuit 4 includes a resistance for detecting a powered device and a signature resistance for classification, and co-operates with the power sourcing equipment 12 to perform a sequence of detection, classification, and power supply of the powered device 11. Operations of the CPU 21, the power supply device 22, and the i/f circuit 4 in the sequence of detection, classification, and power supply will be described with reference to FIG. 7.

Figure 7:
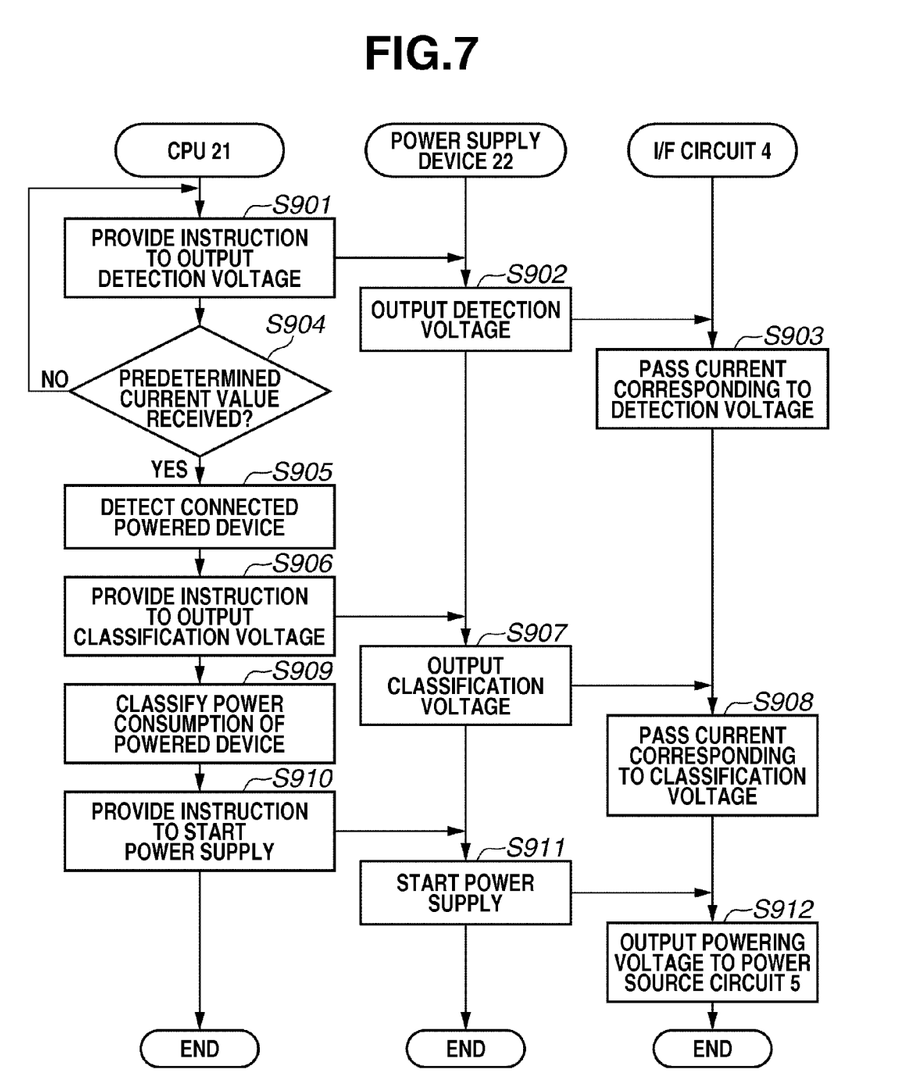
FIG. 7 is a sequence diagram illustrating detection, classification, and power supply of a powered device according to the first exemplary embodiment of the present invention.

1. Detection

When a connection is established between the powered device 11 and the transmission line 10, the detection resistance in the i/f circuit 4 receives a voltage for powered-device detection periodically output from the power supply device 22 in response to an instruction received from the CPU 21. The i/f circuit 4 is energized by receiving the detection voltage and draws a predetermined current from the power sourcing equipment 12 as a response. Upon detecting that a current is being drawn, the detection device 20 in the power sourcing equipment 12 outputs the value of the detected current to the CPU 21. When the detected current has the predetermined value, the CPU 21 detects that the powered device 11 is connected.

More specifically, the i/f circuit 4 includes a 25 KΩ detection resistance, for example. In step S901, the CPU 21 outputs an instruction to the power supply device 22 in the power sourcing equipment 12. Upon receiving the instruction, in step S902, the power supply device 22 periodically outputs a detection voltage in the range from 2.8 to 10 V to the line 17 as a detection signal. In step S903, when the detection resistance in the i/f circuit 4 in the powered device 11 connected to the lines 17 and 18 receives the detection voltage and is energized, a current having a value corresponding to 25 KΩ flows through the lines 17 and 18.

The detection device 20 measures the current flowing through the lines 17 and 18, and outputs the measured value to the CPU 21. If the value of the current flowing through the lines 17 and 18 corresponds to the detection resistance of 25 KΩ in the i/f circuit 4 (YES in step S904), then in step S905, the CPU 21 determines that the powered device 11 is connected to the transmission line 10.

2. Classification

After the detection of the connection of the powered device 11, the CPU 21 in the power sourcing equipment 12 instructs the power supply device 22 to output a classification voltage to the line 17 for classification of power consumption of the detected powered device 11. The classification resistance in the i/f circuit 4 receives the voltage for powered-device classification, and is energized so as to draw a predetermined current from the power sourcing equipment 12 as a response. The detection device 20 in the power sourcing equipment 12 measures the value of the current drawn, and outputs the measured value to the CPU 21. The CPU 21 classifies the power consumption of the powered device 11 based on the measured value.

More specifically, in step S906, the CPU 21 that has detected the connection of the powered device 11 instructs the power supply device 22 to output the classification voltage. In step S907, the power supply device 22 in the power sourcing equipment 12 outputs a voltage in the range from 15.5 to 20.5 V, for example, to the line 17. In step S908, the classification resistance in the i/f circuit 4 in the powered device 11 connected to the line 17 receives the classification voltage and is energized, so that a predetermined current flows through the lines 17 and 18. The detection device 20 measures the current flowing through the lines 17 and 18 and outputs the measured current value to the CPU 21. In step S909, the CPU 21 classifies the power consumption of the powered device 11 based on the current value output from the detection device 20.

3. Power Supply

After the classification of the power consumption of the powered device 11, in step S910, the CPU 21 in the power sourcing equipment 12 instructs the power supply device 22 to start supplying power to the powered device 11. In step S911, the power supply device 22 starts power supply to the i/f circuit 4 via the line 17. Upon receiving the power, in step S912, the i/f circuit 4 outputs a power supply voltage to the powering source circuit 5. The powering source circuit 5 receives the power supply voltage from the i/f circuit 4, and converts and stabilizes the voltage using a DC/DC converter therein, for example.

The sequence of these steps is not limited to that described above. Other sequence may also be employed so long as the CPU 21 in the power sourcing equipment 12 first detects the connection of the powered device 11 using the detection voltage, and then starts power supply to the powered device 11. Further, the detection voltage and the classification voltage used to classify the power consumption of the powered device 11 both output from the power supply device 22 are not limited to the voltage values described above.

The PD circuit 9 which is a circuit of the powered device main body receives the power from the powering source circuit 5, and handles transmission data and received data via the transceiver 8 to use the data for predetermined applications.

The power storage unit 1 stores the power obtained from the detection voltage transmitted from the power sourcing equipment 12, and supplies the stored power to an unbalance detection unit 2 and an unbalance correction unit 3, which will be described below.

Figure 3:
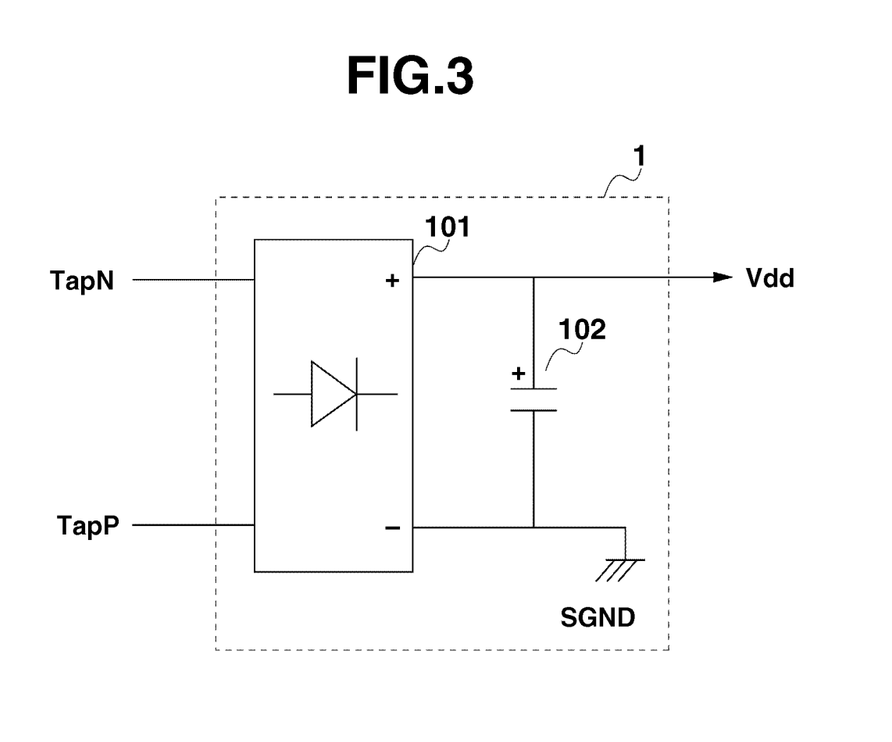
FIG. 3 illustrates a power storage unit according to the first exemplary embodiment of the present invention.

FIG. 3 illustrates a detailed configuration of the power storage unit 1. A diode bridge 101 performs rectification. A capacitor 102 stores electric charge. In the present exemplary embodiment, an electric double layer capacitor is employed as a device for achieving the function. Inputs of the diode bridge 101 are connected to center taps TapP and TapN of the transmission transformer 7. In the detection phase in the power supply sequence, a voltage in the range from 2.8 to 10 V, and a current of up to 5 mA are periodically supplied. The diode bridge 101 rectifies such voltage and current to charge the electric double layer capacitor 102. When the charging voltage reaches a predetermined voltage Vdd, that voltage is supplied as power source voltage to the unbalance detection unit 2 and to the unbalance correction unit 3.

The unbalance detection unit 2 detects an unbalanced condition in the impedance of the transmission line 10 (10*a*) as illustrated in FIG. 2, and outputs a voltage corresponding to a voltage difference between TapP-to-FG voltage and TapN-to-FG voltage, where FG voltage denotes the potential of a frame ground of the powered device 11. The unbalance correction unit 3 includes variable impedances 31 and 32 and control circuits 33 and 34. The control circuits 33 and 34 each receive the output voltage from the unbalance detection unit 2, and perform correction so that the impedance of the transmission line 10 (10*a*) is balanced. In other words, after correction, an impedance of the line 17 (or 17*a*) becomes substantially equal to an impedance of the line 18 (or 18*a*). This can compensate for a situation in which the impedances are unbalanced due, for example, to a stray capacitance between the line 17 (or 17*a*) and FG being unequal to a stray capacitance between the line 18 (or 18*a*) and FG. The unbalance detection unit 2 and the unbalance correction unit 3 are included in the correction unit 19 illustrated in FIGS. 1A and 1B.

The detailed configuration of the unbalance detection unit 2 will be described with reference to FIG. 4. Resistors 204 and 205 divide the TapN-to-FG voltage, while resistors 208 and 209 divide the TapP-to-FG voltage. Resistors 206 and 207 form an inverting amplifier together with an operational amplifier 201. An inverting input terminal of the inverting amplifier receives the voltage obtained by dividing the TapN-to-FG voltage. Resistors 210 and 211 form a noninverting amplifier together with the operational amplifier 201. A noninverting input terminal of the noninverting amplifier receives the voltage obtained by dividing the TapP-to-FG voltage. Together with the inverting amplifier and the noninverting amplifier, the operational amplifier 201 functions as a differential amplifier to output a voltage W corresponding to a voltage difference between the TapP-to-FG voltage and the TapN-to-FG voltage.

The configuration of the unbalance correction unit 3 will be also described with reference to FIG. 4. Resistors 307 and 308 form an inverting amplifier together with an operational amplifier 305. The inverting input terminal of the inverting amplifier receives the output voltage W of the differential amplifier via the resistor 307. The noninverting input terminal of the inverting amplifier is coupled to a reference voltage source 311 which uses FG as a reference potential. Resistors 309 and 310 form a noninverting amplifier together with an operational amplifier 306. The noninverting input terminal of the noninverting amplifier receives the output voltage of the differential amplifier. The inverting input terminal of the noninverting amplifier is coupled to a reference voltage source 312 which uses FG as a reference potential.

The reference voltage sources 311 and 312 correspond to threshold values. When an amount of unbalance detected by the unbalance detection unit 2 exceeds one of the threshold values, the unbalance correction unit 3 starts the correction operation. The illustrated reference voltage sources 311 and 312 may have either polarity.

The output of the operational amplifier 305 is connected with a variable capacitance (varicap) diode 301 and a resistor 303. The output of the operational amplifier 306 is connected with a variable capacitance diode 302 and a resistor 304. The resistors 303 and 304 are respectively connected to the central taps TapP and TapN. These elements form a feedback loop for continuously correcting unbalance in the central taps TapP and TapN. The present exemplary embodiment employs a variable capacitance (varicap) diode as a device for performing the function, but is not limited thereto. Any elements whose capacitance can vary with applied voltage may be used.

The operational flow of the above described power supply system according to the present exemplary embodiment will be described with reference to a sequence diagram in FIG. 5. It is assumed that the impedance of the transmission line 10 is unbalanced. In FIGS. 1A and 1B, when the powered device 11 is not yet connected to the transmission line 10(10a), the power sourcing equipment 12 performs the operation for detecting the powered device 11. As described above, in step S501, the power sourcing equipment 12 periodically outputs a voltage for powered-device detection.

In step S502, the powered device 11 is connected with the transmission line 10(10a). Then, in the power storage unit 1, the diode bridge 101 rectifies the voltage and current obtained from the detection voltage, and charges the electric double layer capacitor 102. In step S503, when the charging voltage reaches the predetermined voltage Vdd, the power storage unit 1 supplies the voltage to the unbalance detection unit 2 and to the unbalance correction unit 3.

Upon receiving the supplied power source voltage, in step S504, the unbalance detection unit 2 causes the operational amplifier 201 to start operating as the differential amplifier to output the voltage W corresponding to the voltage difference between the TapP-to-FG voltage and the TapN-to-FG voltage. In step S505, the powered device 11 performs the following correction operation so that the impedance of the transmission line 10 is balanced. The operational amplifier 305 functions as an inverting amplifier whose output voltage is $Y+R_{308}/R_{307}(Y-W)$, where $R_{308}$ is the resistance of the resistor 308 and $R_{307}$ is the resistance of the resistor 307. The operational amplifier 306 functions as an non-inverting amplifier whose output voltage is $-(R_{310}/R_{309})X+(1+R_{310}/R_{309})W$, where $R_{310}$ is the resistance of the resistor 310 and $R_{309}$ is the resistance of the resistor 309. The output values X and Y correspond to minimum and maximum threshold values, respectively, for the voltage difference between the TapP-to-FG voltage and the TapN-to-FG voltage. For example, the minimum threshold value is −1V and the maximum threshold value is 1V. The output value X is set in dependence upon the minimum threshold value and the resistances $R_{309}$ and $R_{310}$.

Similarly, the output value Y is set in dependence upon the maximum threshold value and the resistances $R_{307}$ and $R_{308}$. For example, if resister 308 has 9 times the resistance of the resistor 307 and Y=+1.1V, the output voltage of the operational amplifier will vary from +20V when W=−1V to +2V when W=+1. Similarly, if resister 310 has 8 times the resistance of the resistor 309 and X=−1.375V, the output voltage of the operational amplifier will vary from +20V when W=+1V to +2V when V=−1V.

Generally, impedance is expressed as "direct-current resistance+alternating-current resistance", and is represented by $$R+1/2\pi fC+2\pi fL \qquad \text{Expression (1)}$$

where R is direct-current resistance (Ω), f is frequency (Hz), C is capacitance (F), and L is inductance (H).

Induced AC noise is mainly common-mode noise, and an equal noise current flows from a noise source through the transmission line 10 to FG. Thus, even in the presence of induced noise, currents flowing through the lines 17 and 18 are equal to each other. When there is a balanced condition between the center taps TapP and TapN, TapP-to-FG impedance and TapN-to-FG impedance are equal to each other. Accordingly, in the case of the balanced condition between the center taps TapP and TapN, a product of multiplying the noise current by the impedance is detected as the voltage, and a relationship |TapP-to-FG voltage|=|TapN-to-FG voltage| is satisfied.

However, when there is an unbalanced condition between the center taps TapP and TapN, the relationship may be |TapP-to-FG voltage|≠|TapN-to-FG voltage|. Considering the polarity of power supply, the TapP-to-FG voltage and the TapN-to-FG voltage are expressed in absolute values. Since the center taps TapP and TapN are forward and backward paths for the current output from the power sourcing equipment 12 to the powered device 11, the TapP-to-FG voltage and the TapN-to-FG voltage have opposite polarities.

When there is a balanced condition between TapP and TapN, the relationship |TapP-to-FG voltage|≈|TapN-to-FG voltage| holds, and the output voltage W of the operational amplifier 201 functioning as the differential amplifier is at or near zero. If a difference in stray capacitance, for example, causes the relationship |TapP-to-FG voltage|<|TapN-to-FG voltage|, the output voltage W' of the operational amplifier 201 decreases, as compared with the case where there is the balanced condition between TapP and TapN, to a value below zero.

In this case, the output voltage of the operational amplifier 306 decreases from a relatively high positive value to a relatively low positive value Then, the voltage applied to the variable capacitance diode 302 decreases according to the output voltage from the operational amplifier 306. Generally, capacitance of a variable capacitance diode is inversely proportional to the square root of applied voltage. Thus, when the applied voltage increases the capacitance of the variable capacitance diode 302 is increased. Accordingly, the increased capacitance reduces the alternating-current resistance in Expression (1), and the impedance of the center tap TapN is reduced. This results in a decrease in |TapN-to-FG voltage| which is the voltage difference. A variable capacitance diode must always be reverse biased, and accordingly the potential applied to the cathode of the variable capacitance diode 302 by the operational amplifier 306 must always be more positive than the potential (ground potential) applied to the anode.

The operational amplifier 305 also receives the output voltage W of the operational amplifier 201 functioning as the differential amplifier. However, since W<<the maximum threshold value (e.g. +1V) (e.g. +1V), the output voltage of the operational amplifier 305 becomes the maximum positive value. Then, the voltage applied to the variable capacitance diode 301 increases according to the output voltage from the operational amplifier 305. Thus, the capacitance of the variable capacitance diode 301 is decreased. Accordingly, virtually no load is imposed on TapP. In this way, the feedback operation for causing the output voltage W of the operational amplifier 201 as the differential amplifier to be greater than or equal to the threshold value X is performed. The unbalanced condition is corrected by such control.

On the other hand, when the relationship |TapP-to-FG voltage|>|TapN-to-FG voltage| is satisfied, the output voltage W of the operational amplifier 201 as the differential amplifier is increased as compared to when there is the balanced condition between the center taps TapP and TapN, to a value greater than zero. In this case, the output voltage of the operational amplifier 306 decreases from a relatively high positive value to a relatively low positive value. Then, the voltage applied to the variable capacitance diode 301 decreases according to the output of the operational amplifier 305. Thus, the capacitance of the variable capacitance diode 301, which is inversely proportional to the square root of the applied voltage as described above, increases. The increased capacitance results in a decrease in the alternating-current resistance, and in a decrease in the impedance of the center tap TapP.

In this way, the feedback operation for causing the output voltage W of the operational amplifier 201 as the differential amplifier to be smaller than or equal to the threshold value Y is performed. The unbalanced condition is corrected by such control. At this time, the operational amplifier 306 also receives the output voltage W of the operational amplifier 201 as the differential amplifier. However, since W>>the minimum threshold value (e.g. −1V), the output potential of the operational amplifier 306 becomes the maximum positive value. Then, the voltage applied to the variable capacitance diode 302 increases according to the output voltage from the operational amplifier 306. Thus, the capacitance of the variable capacitance diode 302 is decreased. Accordingly, virtually no load is imposed on TapN.

After the correction unit 19 starts operating, in step S506, the signature resistance in the i/f circuit 4 is energized. Then, currents corresponding to the detection voltage and to the signature resistance flow through the lines 17 and 18 with the unbalanced condition corrected. The detection device 20 in the power sourcing equipment 12 measures the value of the currents flowing through the lines 17 and 18 to output the measured value to the CPU 21. When the CPU 21 receives the output from the detection device 20, and detects that the predetermined currents corresponding to the detection voltage and to the signature resistance have passed through the lines 17 and 18 (YES in step S507), the power supply system proceeds to the classification phase.

In the classification phase, in step S508, the detection device 20 in the power sourcing equipment 12 outputs a classification voltage. In step S509, in the powered device 11, the classification resistance in the i/f circuit 4 is energized by the application of the classification voltage and generates a predetermined current. In step S510, the detection device 20 in the power sourcing equipment 12 measures the current. The CPU 21 classifies the type of the powered device 11 based on the current value output from the detection device 20. In step S511, the CPU 21 instructs the power supply device 22 to start power supply. The power supply device 22 outputs a voltage of about 48 V to the transmission line 10, so that the power sourcing equipment 12 starts the power supply to the powered device 11. In step S512, the powered device 11 receives the power and a power supply switch in the i/f circuit 4 is turned on, so that the power is supplied to the powering source circuit 5. The powering source circuit 5 converts and stabilizes the voltage, and provides the power to the PD circuit 9, and the powered device 11 starts the operation. Then, communication is initiated.

In this way, the impedance unbalance in the transmission line 10 including the power sourcing equipment 12 is detected and corrected using the power used to detect the connection of the powered device 11 in the detection phase. Accordingly, the impedance unbalance in the transmission line 10 can be corrected on the powered device 11 side, and the connectivity between the power sourcing equipment 12 and the powered device 11 can be enhanced. Further, the system having the enhanced connectivity can be established just by replacement with the powered device, without the need to replace the networking equipment, such as the already-existing power sourcing equipment and the installation condition thereof.

In the foregoing description, the power storage unit 1 stores the detection voltage. However, in the configuration described above, the power storage unit 1 can store, in addition to the power of the detection voltage, the power of the classification voltage output from the power sourcing equipment 12 to specify the type of the powered device 11, and can supply the stored power to the correction unit 19. After the power supply is started, the power storage unit 1 may also store the power provided from the power sourcing equipment 12 to supply the stored power to the correction unit 19.

Figure 5:
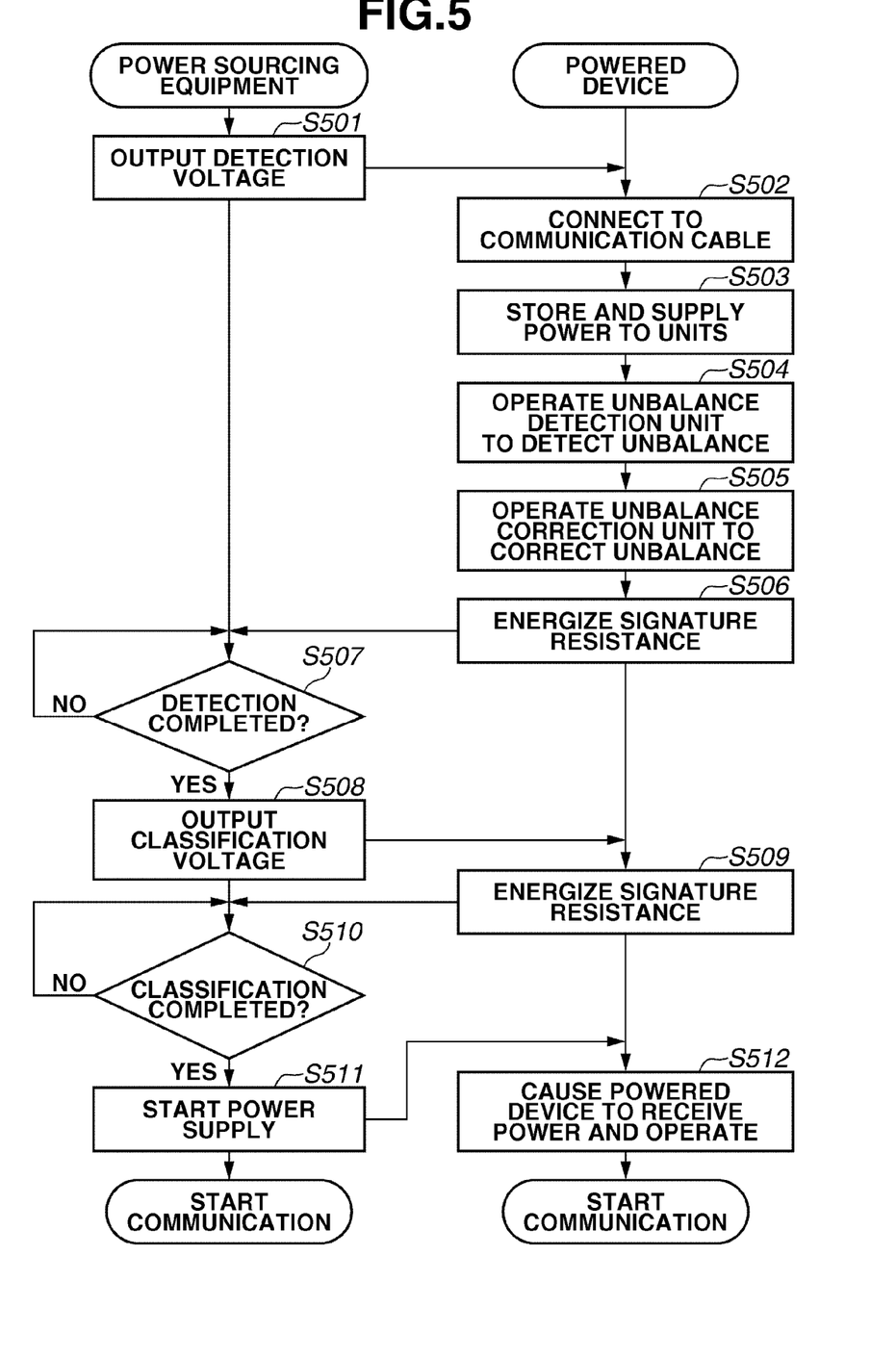
FIG. 5 is a sequence diagram illustrating the first exemplary embodiment of the present invention.

In step S508 illustrated in FIG. 5, when the power sourcing equipment 12 outputs the classification voltage, the power storage unit 1 may store the classification voltage and supply the stored power to the correction unit 19 as in the case of the detection voltage. Thus, in addition to the effects of the present invention set forth in the above described exemplary embodiment, the following effects are attainable. More specifically, when the power sourcing equipment 12 classifies the powered device 11 using the classification voltage, the correction unit 19 may correct the impedance unbalance in the transmission line 10 to allow the power sourcing equipment 12 to classify the powered device 11 precisely and smoothly.

Moreover, in step S512 illustrated in FIG. 5, after the power supply is started, the power storage unit 1 may store the power supplied from the power sourcing equipment 12 and output the stored power to the correction unit 19. This can provide the following effects in addition to the effects of the present invention set forth in the above described exemplary embodiment. More specifically, the impedance unbalance in the transmission line 10 can be corrected after the start of the power supply as well, thus the stable supply of the power can be secured. Accordingly, the enhanced connectivity and the stable power supply are both attainable without the need for any particular changeover. Alternatively, the power supply system may be configured so that once power supply is started, the powering source circuit 5 supplies the power to the correction unit 19. In this case, both the enhanced detectability and the stable power supply are also achievable.

In the first exemplary embodiment, the unbalance detection unit 2 is used to detect the impedance unbalance in the transmission line 10. In a second exemplary embodiment, a configuration for simultaneously performing detection and correction of an unbalanced condition will be described.

The configuration of a power supply system according to the second exemplary embodiment will be described. The general configurations of the power sourcing equipment 12 and the powered device 11 are the same as those described with reference to FIGS. 1A, 1B, and 2 in the first exemplary embodiment, and thus will not be further described. A power storage unit 1, an i/f circuit 4, a powering source circuit 5, an RJ-45 connector 6, a transmission transformer 7, a transceiver 8, and a PD circuit 9 in the second exemplary embodiment also have the same configurations as those described in the first exemplary embodiment, and thus will not be further described.

Figure 6:
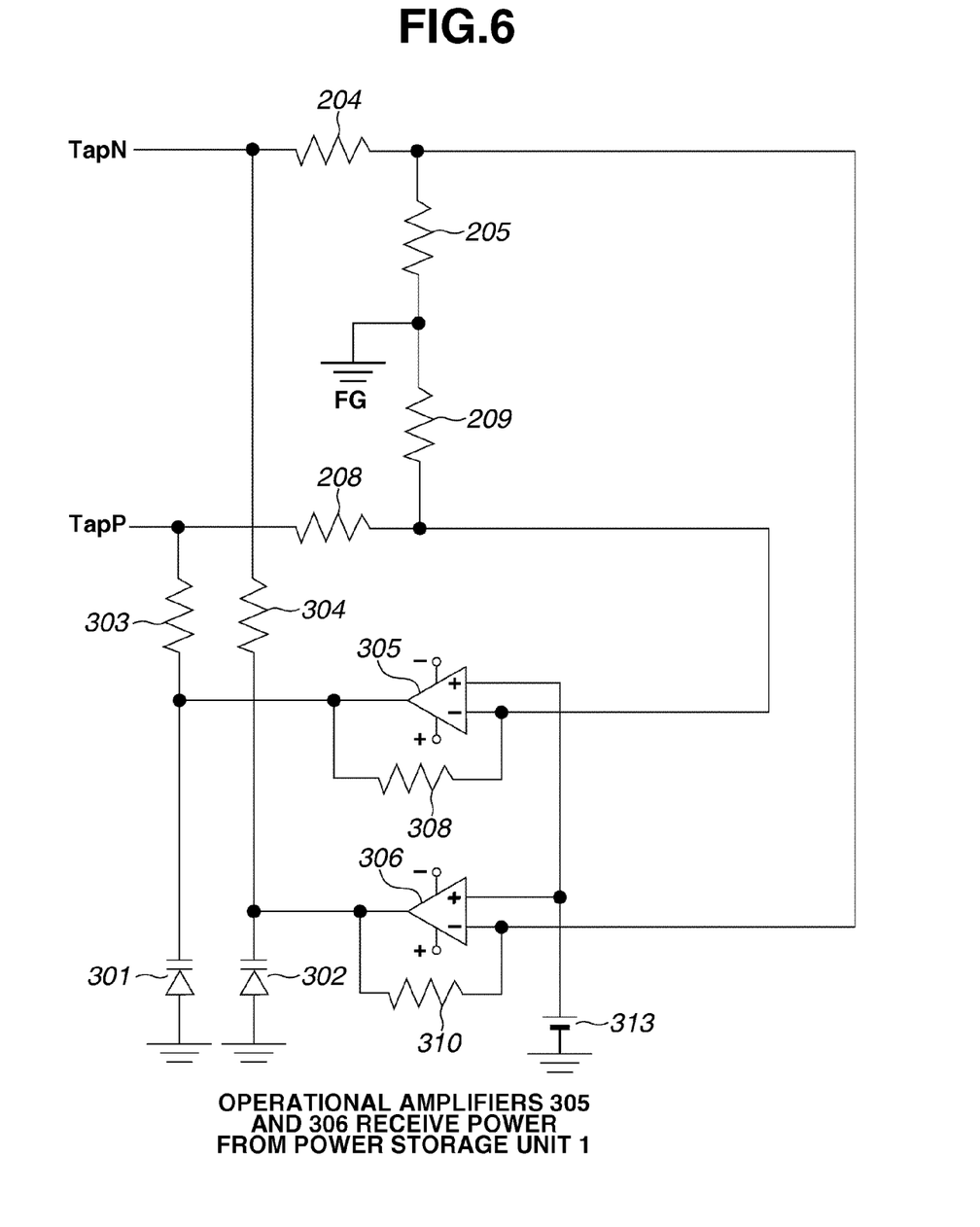
FIG. 6 illustrates a correction unit according to a second exemplary embodiment of the present invention.

Referring to FIG. 6, a configuration of a correction unit 19 in the second exemplary embodiment will be described. A circuit illustrated in FIG. 6 functions as both the unbalance detection unit 2 and the unbalance correction unit 3 described in the first exemplary embodiment. In FIG. 6, resistors 204 and 205 for dividing the TapN-to-FG voltage, and resistors 208 and 209 for dividing the TapP-to-FG voltage are the same as those illustrated in FIG. 4, and thus are designated by the same reference numerals. In FIG. 6, variable capacitance diodes 301 and 302, resistors 303 and 304, and operational amplifiers 305 and 306 are also the same components as those described in the first exemplary embodiment, and will not be further described.

A reference voltage source 313 is connected to the noninverting input terminals of the operational amplifiers 305 and 306. The inverting input terminals of the operational amplifiers 305 and 306 receive voltages at the center taps TapP and TapN, respectively.

The operational flow of the powered device 11 configured as described above follows the steps in the flow illustrated in the sequence diagram in FIG. 5 in the first exemplary embodiment. However, a feature of the power supply system according to the second exemplary embodiment is that in the correction unit 19 the operational amplifier 201 is omitted and TapN is applied to the inverting input of the operational amplifier 306 and TapP is applied to the inverting input of the operational amplifier 305.

The operation of the correction unit 19 in the second exemplary embodiment will be described with reference to FIG. 6. In FIG. 6, as |TapN-to-FG voltage| increases, the voltage at the inverting input terminal of the operational amplifier 306 increases. The reference voltage source 313 applies a fixed output value Vref to the non-inverting input terminal of the operational amplifier 306. In this embodiment a common maximum threshold value is applied to both |TapN-to-FG voltage| and |TapP-to-FG voltage|, and Vref is set in dependence upon this common maximum threshold voltage, taking into account the resistances of the resistors 204, 205, 208, 209, 308 and 310. Thus, as |TapN-to-FG voltage| increases, the output voltage of the operational amplifier 306 decreases, resulting in a corresponding drop in the voltage applied to the variable capacitance diode 302. Accordingly, as described in the first exemplary embodiment, the capacitance of the variable capacitance diode 302 increases to lower the alternating-current resistance and to reduce the impedance of the center tap TapN. As a result, |TapN-to-FG voltage| decreases. In this way, the feedback operation for causing the output voltage of the operational amplifier 306 to become smaller as |TapN-to-FG voltage| approaches the maximum threshold value is performed, so that the unbalanced condition can be corrected.

As |TapP-to-FG voltage| increases, the voltage at the inverting input terminal of the operational amplifier 305 increases. The reference voltage source 313 applies the same fixed output value Vref to the non-inverting input terminal of the operational amplifier 305. Thus, as |TapP-to-FG voltage| increases, the output voltage of the operational amplifier 305 decreases, resulting in a corresponding decrease in the voltage applied to the variable capacitance diode 301. Due to the above described property, the capacitance of the variable capacitance diode 301 increases to decrease the alternating-current resistance and hence the impedance of the center tap TapP. Consequently, |TapP-to-FG voltage| decreases. In this way, the feedback operation for causing the output voltage of the operational amplifier 305 to become smaller as |TapP-to-FG voltage| approaches the maximum threshold value Vref is performed, and the unbalanced condition can be corrected.

The configuration described above enables the correction unit 19 to be simplified. Further in the present exemplary embodiment, resistors, operational amplifiers, a reference voltage source, and variable capacitance diodes are used as the devices for implementing the functions of the correction unit 19. However, other devices may implement the functions of the correction unit 19, in which case the essence of the present invention remains unchanged, and the same effects are attainable.

Figure 4:
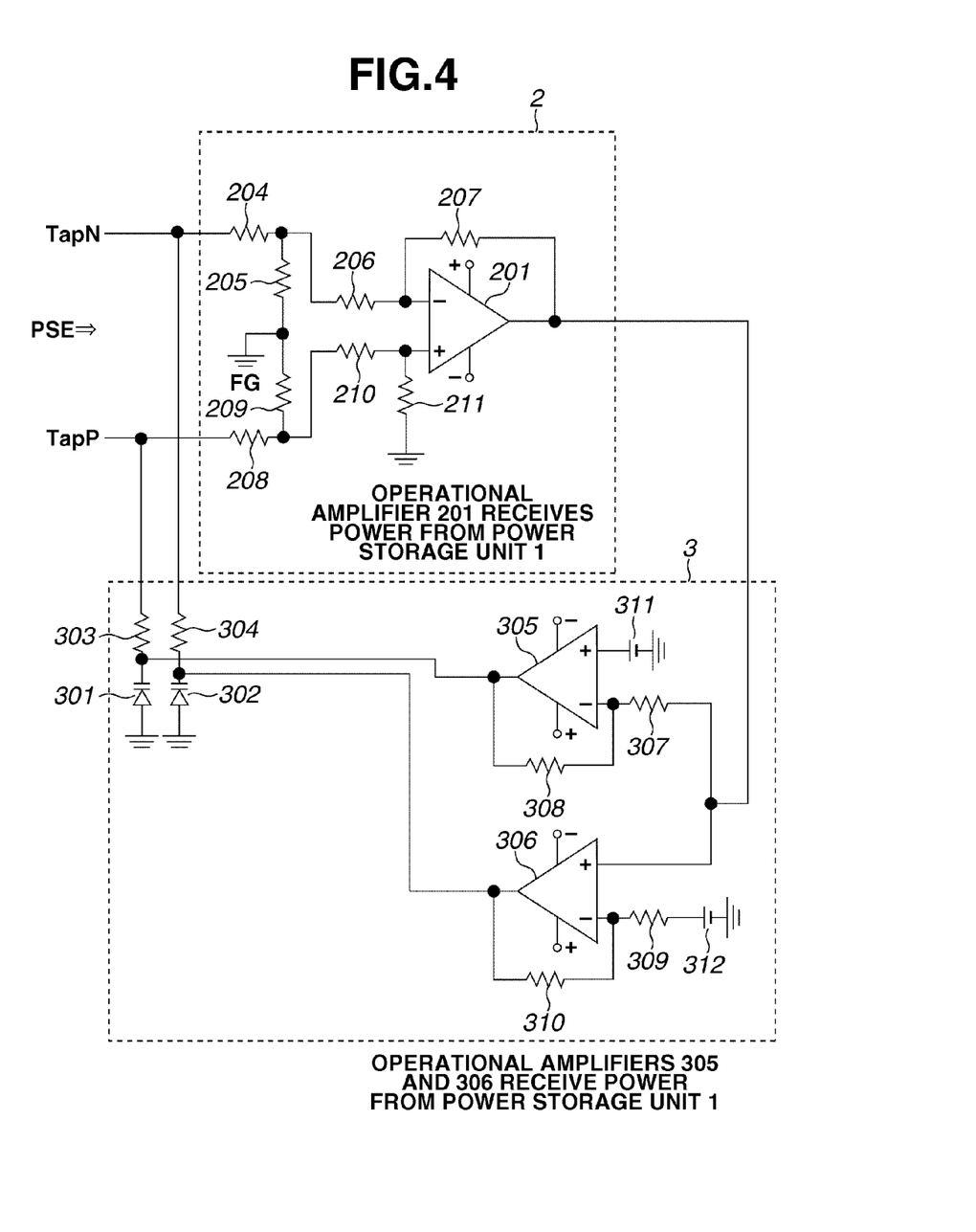
FIG. 4 illustrates an unbalance detection unit and an unbalance correction unit according to the first exemplary embodiment of the present invention.

The operational amplifiers 305, and 306 illustrated in FIG. 6, similar to the operational amplifiers 305 and 306 illustrated in FIG. 4, may be provided with resistors as feedback circuits. The presence of the feedback circuits enables the operational amplifiers 305, and 306 to operate with higher stability.

In the present exemplary embodiment, as in the first exemplary embodiment, the power storage unit 1 can store the power obtained from the classification voltage and the power provided from the power sourcing equipment 12 in addition to the power obtained from the detection voltage, to supply the stored power to the correction unit 19. Alternatively, the power supply system may be configured so that once power supply is started, the powering source circuit 5 supplies the power to the correction unit 19.

In the present invention, devices other than resistors and operational amplifiers may serve as the devices for implementing the functions of the unbalance detection unit 2. In this case, the essence of the present invention also remains unchanged, and the same effects are attainable.

Further in the present invention, devices other than resistors, operational amplifiers, a reference voltage source, and variable capacitance diodes may serve as the devices for implementing the functions of the unbalance correction unit 3. In this case, the essence of the present invention also remains unchanged, and the same effects are attainable.

Furthermore, in the present invention, instead of devices that can be changed in capacitance, units whose resistance value can be changed may be used as the variable impedance elements. In this case, the essence of the present invention also remains unchanged, and the same effects are attainable. For example, field-effect transistors (FETs) can be used in place of the variable capacitance diodes 301 and 302 in the first and second embodiments. In this case, the output voltage of the relevant operational amplifier 305 or 306 is applied to a gate of the FET, and the drain-source channel of the FET is connected in series with the relevant resistor 303 or 304. The resistance of the channel can then be controlled by the relevant operational amplifier 305 or 306. For example, as in the second embodiment the channel resistances can be controlled so that the load imposed on TapN increases when |TapN-to-FG voltage| approaches the maximum threshold value and so that the load imposed on TapP increases when |TapP-to-FG voltage| approaches the maximum threshold value. Alternatively, as in the first embodiment the channel resistances can be controlled so that the load imposed on TapN increases when |TapP-to-FG voltage|<|TapN-to-FG voltage| and so that the load imposed on TapP increases when |TapP-to-FG voltage|>|TapN-to-FG voltage|.

All or a part of the devices for implementing the functions of the power storage unit 1, unbalance detection unit 2, and unbalance correction unit 3 may be provided on a single semiconductor substrate. This configuration allows a further reduction in power consumption in addition to providing the effects of the exemplary embodiments set forth above. Further, the power storage unit 1, the unbalance detection unit 2, and the unbalance correction unit 3 can be reduced in size.

The unbalance detection unit 2 and the unbalance correction unit 3 in the present invention are not limited to the configurations described in the first and second exemplary embodiments, and may be any units capable of correcting an impedance unbalance in transmission lines.

In the sequence diagram in FIG. 5, after the correction of the unbalance in step S505, the signature resistance is energized in step S506. However, the signature resistance may be energized before the correction of the unbalance. In this case, the essence of the present invention also remains unchanged, and the same effects are attainable.

The present invention may employ, as the power supply systems, PoE that is specified by the IEEE802.3af standard or PoE Plus that is in compliance with the IEEE802.3at standard, which is the higher standard of the IEEE802.3af standard. In this case, an Ethernet (registered trademark) cable that is PoE or PoE Plus compliant may be used as the transmission line 10. In PoE Plus, the algorithm for the powered-device detection phase is the same, and hence the same effects as those obtainable with PoE can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-030455 filed Feb. 15, 2010, which is hereby incorporated by reference herein in its entirety.

What is claimed is:

1. A power supply system, comprising:
a power sourcing equipment; and
a powered device configured to receive power from the power sourcing equipment via a pair of lines,
wherein the power sourcing equipment starts power supply to the powered device after outputting a detection signal to the powered device via the pair of lines and detecting a first predetermined response made by the powered device to the detection signal, and the first predetermined response indicates that the powered device is connected to the pair of lines,
wherein the powered device includes
a storage unit configured to store power, and
a correction unit configured to correct an impedance unbalance in the pair of lines,
wherein the storage unit stores power obtained from the detection signal output from the power sourcing equipment and provides to the correction unit the stored power to operate the correction unit, and
wherein the correction unit being provided with the stored power from the storage unit corrects, based on a first voltage on a first line of the pair of lines and a second voltage on a second line of the pair of lines, the impedance unbalance in the pair of lines before the power sourcing equipment starts the power supply to the powered device.

2. The power supply system according to claim 1, wherein before the power sourcing equipment starts power supply to the powered device, the storage unit stores the power obtained from the detection signal and provides the stored power to the correction unit, and
after the power sourcing equipment starts power supply to the powered device, the storage unit stores the power provided from the power sourcing equipment and provides the stored power to the correction unit.

3. The power supply system according to claim 1, wherein the power supply system is compliant with Power over Ethernet (PoE, registered trademark) specified in the Institute of Electrical and Electronics Engineers (IEEE) 802.3af standard, and the pair of lines is a PoE-compliant Ethernet (registered trademark) cable.

4. The power supply system according to claim 1, wherein the power supply system is compliant with Power over Ethernet (PoE, registered trademark) specified in the Institute of Electrical and Electronics Engineers (IEEE) 802.3at standard, and the pair of lines is a PoE Plus-compliant Ethernet (registered trademark) cable.

5. The power supply system according to claim 1, wherein the correction unit includes,
an unbalance detection unit configured to output a voltage corresponding to a voltage difference between the first voltage on the first line of the pair of lines and the second voltage on the second line of the pair of lines, and
an unbalance correction unit configured to perform correction so that the voltage output from the unbalance detection unit has a value within a predetermined value range.

6. The power supply system according to claim 5, wherein the power storage unit, the unbalance detection unit, and the unbalance correction unit are formed on a single semiconductor substrate.

7. The power supply system according to claim 1, wherein the power sourcing equipment starts power supply to the powered device after outputting a classification signal to the powered device via the pair of lines and detecting a second predetermined response made by the powered device to the classification signal, and the second predetermined response indicates power consumption of the powered device and the classification signal is output after the detection signal is output,
wherein the correction unit being provided with the stored power from the storage unit corrects, based on the first voltage on the first line of the pair of lines and the second voltage on the second line of the pair of lines, the impedance unbalance in the pair of lines after the power sourcing equipment outputs the detection signal and before the power sourcing equipment outputs the classification signal.

8. The power supply system according to claim 1, wherein the power sourcing equipment starts power supply to the powered device after outputting a classification signal to the powered device via the pair of lines and detecting a second predetermined response made by the powered device to the classification signal, and the second predetermined response indicates power consumption of the powered device and the classification signal is output after the detection signal is output,
wherein the correction unit being provided with the stored power from the storage unit corrects, based on the first voltage on the first line of the pair of lines and the second voltage on the second line of the pair of lines, the impedance unbalance in the pair of lines after the power sourcing equipment outputs the classification signal and before the power sourcing equipment starts the power supply to the powered device.

9. The power supply system according to claim 1, wherein the correction unit starts, after the stored power from the storage unit is provided to the correction unit, correcting the impedance unbalance in the pair of lines based on the first voltage and the second voltage.

10. A powered device for receiving power from a power sourcing equipment via a pair of lines after making a first predetermined response via the pair of lines to a detection signal output from the power sourcing equipment, and the first predetermined response indicates that the powered device is connected to the pair of lines, the powered device comprising:
- a storage unit configured to store power; and
- a correction unit configured to correct an impedance unbalance in the pair of lines,
- wherein the storage unit stores power obtained from the detection signal output from the power sourcing equipment and provides to the correction unit the stored power to operate the correction unit, and
- wherein the correction unit being provided with the stored power from the storage unit corrects, based on a first voltage on a first line of the pair of lines and a second voltage on a second line of the pair of lines, the impedance unbalance in the pair of lines before the power sourcing equipment starts the power supply to the powered device.

11. The powered device according to claim 10, wherein
before the power sourcing equipment starts power supply to the powered device, the storage unit stores the power obtained from the detection signal and provides the stored power to the correction unit, and
after the power sourcing equipment starts power supply to the powered device, the storage unit stores the power provided from the power sourcing equipment and provides the stored power to the correction unit.

12. The powered device according to claim 10, wherein
the powered device receives power from the power sourcing equipment via a pair of lines after making a second predetermined response via the pair of lines to a classification signal output from the power sourcing equipment, and the second predetermined response indicates power consumption of the powered device and the classification signal is output after the detection signal is output,
wherein the correction unit being provided with the stored power from the storage unit corrects, based on the first voltage on the first line of the pair of lines and the second voltage on the second line of the pair of lines, an impedance unbalance in the pair of lines after the power sourcing equipment outputs the detection signal and before the power sourcing equipment outputs the classification signal.

13. The powered device according to claim 10, wherein
the powered device receives power from the power sourcing equipment via a pair of lines after making a second predetermined response via the pair of lines to a classification signal output from the power sourcing equipment, and the second predetermined response indicates power consumption of the powered device and the classification signal is output after the detection signal is output,
wherein the correction unit being provided with the stored power from the storage unit corrects, based on the first voltage on the first line of the pair of lines and the second voltage on the second line of the pair of lines, an impedance unbalance in the pair of lines after the power sourcing equipment outputs the classification signal and before the power sourcing equipment starts the power supply to the powered device.

14. The powered device according to claim 10, wherein
the correction unit starts, after the stored power from the storage unit is provided to the correction unit, correcting the impedance unbalance in the pair of lines based on the first voltage and the second voltage.

15. A method for receiving power in a powered device, wherein the powered device includes,
- a response unit configured to make a first predetermined response to a detection signal output from a power sourcing equipment via a pair of lines, and the first predetermined response indicates that the powered device is connected to the pair of lines,
- a storage unit configured to store power,
- a correction unit configured to correct an impedance unbalance in the pair of lines, and
- a power reception unit configured to receive power from the power sourcing equipment via the pair of lines, the method comprising:
causing the storage unit to store power obtained from the detection signal output from the power sourcing equipment and to provide to the correction unit the stored power to operate the correction unit;
causing the power reception unit to receive power via the pair of lines from the power sourcing equipment that has detected the first predetermined response; and
causing the correction unit being provided with the stored power from the storage unit to correct, based on a first voltage on a first line of the pair of lines and a second voltage on a second line of the pair of lines, the impedance unbalance in the pair of lines before the power sourcing equipment starts the power supply to the powered device.

16. The method according to claim 15, further comprising:
before the powered device starts the reception of the power from the power sourcing equipment, causing the storage unit to store the power obtained from the detection signal and to provide the stored power to the correction unit; and
after the powered device starts the reception of the power from the power sourcing equipment, causing the storage unit to store the power provided from the power sourcing equipment and to provide the stored power to the correction unit.

17. The method according to claim 15, wherein
the powered device receives power from the power sourcing equipment via a pair of lines after making a second predetermined response via the pair of lines to a classification signal output from the power sourcing equipment, and the second predetermined response indicates power consumption of the powered device and the classification signal is output after the detection signal is output,
wherein causing the correction unit being provided with the stored power from the storage unit to correct, based on the first voltage on the first line from the pair of lines and the second voltage on the second line from the pair of lines, an impedance unbalance in the pair of lines after the power sourcing equipment outputs the detection signal and before the power sourcing equipment outputs the classification signal.

18. The method according to claim 15, wherein
the powered device receives power from the power sourcing equipment via a pair of lines after making a second predetermined response via the pair of lines to a classification signal output from the power sourcing equipment, and the second predetermined response indicates power consumption of the powered device and the classification signal is output after the detection signal is output, wherein causing the correction unit being provided with the stored power from the storage unit to correct, based on the first voltage on the first line from the pair of lines and the second voltage on the second line from the pair of lines, an impedance unbalance in the pair of lines after the power sourcing equipment outputs the classification signal and before the power sourcing equipment starts the power supply to the powered device.

19. The method according to claim 15, wherein causing the correction unit to start, after the stored power from the storage unit is provided to the correction unit, correcting the impedance unbalance in the pair of lines based on the first voltage and the second voltage.

* * * * *